Dec. 10, 1929.  E. H. NEWKIRK  1,738,789
OUTSIDE FISHING TOOL FOR USE IN DEEP WELLS
Filed Nov. 5, 1927
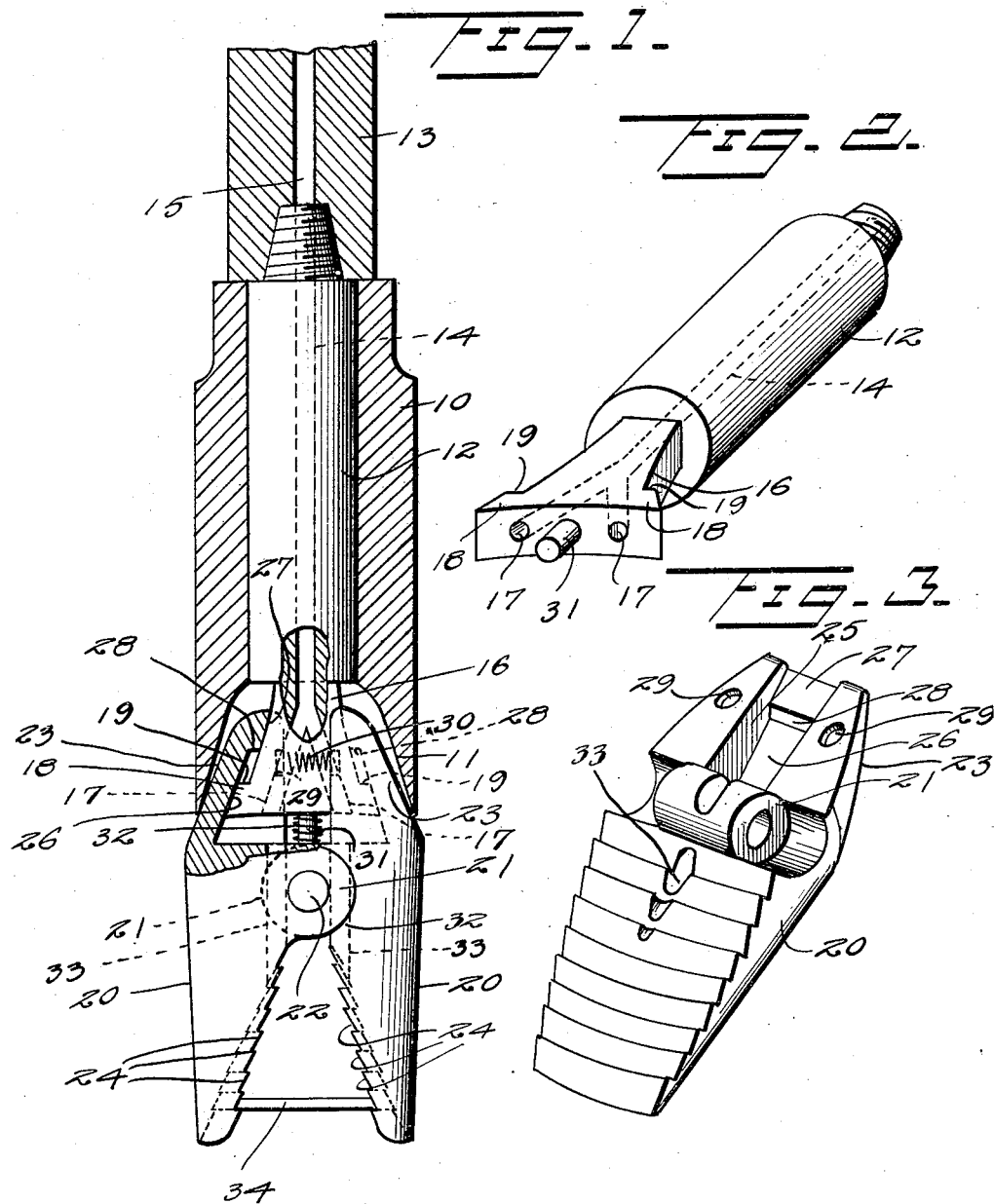
Inventor
E. H. Newkirk
By Watson E. Coleman
Attorney Patented Dec. 10, 1929

1,738,789

UNITED STATES PATENT OFFICE

EDGAR H. NEWKIRK, OF OKLAHOMA CITY, OKLAHOMA

OUTSIDE FISHING TOOL FOR USE IN DEEP WELLS

Application filed November 5, 1927. Serial No. 231,316.

This invention relates to fishing tools for use in deep wells and more particularly to an outside fishing tool or tool adapted to exteriorly grasp rods, pipe or similar elements which have been broken off within the well.

An important object of the invention is to provide a device of this character which will enable a very positive and firm grip to be taken upon the article being fished for and which may be very readily and cheaply produced.

A further object of the invention is to provide for the circulation of flushing water within the well bore during the fishing operation, so that so far as possible the article may be freed from any obstructing débris which would otherwise interfere with the removal thereof.

A further object of the invention is the provision of a structure of this character in which the setting of the jaws may be very readily accomplished.

These and other objects I attain by the construction shown in the accompanying drawing, wherein for the purpose of illustration is shown a preferred embodiment of my invention and wherein:—

Figure 1 is a vertical sectional view partially broken away showing an outside fishing tool constructed in accordance with my invention, the parts being in the position which they occupy when lowered into the well;

Figure 2 is a perspective view of a plunger removed;

Figure 3 is a perspective view of one of the jaws.

Referring now more particularly to the drawing, the numeral 10 generally designates a barrel having a bore, the lower end of which has a substantially conical enlargement 11, the base of which is disposed downwardly, so that the enlargement increases in diameter toward its lower end. Slidable in the bore is a plunger 12 adapted at its upper end for connection with a fishing string 13 and having a water course 14 forming a continuation of the water course 15 of the string.

At its lower end, this plunger has a wedge-shaped head 16, the smaller end of the wedge being connected with the lower end of the plunger and the larger end thereof having outlet ports 17 which are in communication with the bore of the water course 14 of the plunger. The wedge is flattened on its side faces and of less width than the plunger body and upon its wedge faces adjacent the base end thereof has outstanding lugs 18 forming upwardly facing shoulders 19, the purpose of which will presently appear.

A pair of jaws 20 are provided, these jaws being provided intermediate the ends thereof upon confronting faces with inter-engaging ears 21 for the reception of a pivot pin 22, by means of which the jaws may be pivoted to one another. The upper ends of the jaws are so tapered upon their outer faces, as indicated at 23, that when the jaws are in assembled relation, these upper ends present a conical structure for engagement in the tapered enlargement 11 of the bore 10 of the body. Below the pivots, adjacent faces of the jaws diverge, when the general planes of the jaws are parallel to one another, and these faces are formed with upwardly facing teeth 24 for grasping the fish. Above the pivot, the faces of the jaws, under the same circumstances, are substantially parallel with one another and are formed centrally with recesses 25, the inner walls 26 of which converge upwardly. At their upper ends, the inner walls 26 of these recesses are offset inwardly, as indicated at 27, to thereby produce downwardly facing shoulders 28. The recesses 25 combine to receive the head 16 and the outer faces of the lugs 18 slide against the walls 26, the shoulders 19 of the lugs facing the shoulders 28 of these inner walls, with the result that if the jaws be drawn downwardly, the shoulders will come into contact and limit this downward movement.

While I have above described the taper of the upper ends of the assembled jaws as being substantially that of the enlargement 11 of the body bore, it will be noted, from an inspection of Figure 1 that the taper of the upper ends of the jaws is more abrupt than the taper of the enlargement 11, thus allowing between the upper extremities of the jaws and the walls of the enlargement 11 space for the expansion which becomes necessary as the jaws 20 move downwardly and are expanded by the engagement of the walls 26 with the lugs 28.

At opposite sides of the recesses 25, the jaws have opposing sockets 29 receiving the ends of springs 30 which tend to expand the upper ends of the jaws. The head 16 upon its lower end has a small lug 31 forming an anchor pin for a compression spring 32, the lower end of which abuts a pivot lug 21 of one of the jaws, so that the upper ends of the jaws are constantly urged apart both by the springs 30 and by the tendency to downward movement of the jaws with relation to the head brought about both by gravity and the spring 32. The jaws are constructed to provide downwardly extending ports 33, the upper ends of which communicate with the lower ends of the recesses 25 and the lower ends of which open through the upper ends of the toothed faces thereof, so that flushing water may be conducted downwardly to the lower ends of these jaws.

In the use of the device, the jaws are assembled upon the head and the plunger inserted in the bore of the body until the lower end of the plunger engages against the taper of the jaws. A readily frangible element, such as a stick of wood, is inserted between the lower ends of the jaws 20 to maintain them in spaced relation. The device is lowered into the well until coming into contact with the fish, the frangible element 34 is broken, permitting the lower ends of the jaws to approach one another, the jaws moving at this time under the influence of the springs 30 and 32 and of gravity. The fish having been engaged, the string 13 is elevated and as it is elevated, the wedge head 16 and more particularly the lugs 18 thereof will serve to expand the upper ends of the jaws, causing the teeth 24 to firmly bite into the fish and grip the same, so that it may be pulled from the well. The barrel serves to prevent disengagement of the jaws from the plunger 12 in event the pin 22 becomes broken in operation or in event in lowering the tool into the well, the frangible element 34 becomes accidentally broken during the lowering operation.

It will be obvious that with a device of this character, a very firm grip may be taken upon the article, so that a removal thereof may be assured. It will also be obvious that the construction employed is such that the tool may be very readily and cheaply constructed and is readily assembled and prepared for use.

As this construction is capable of a certain range of change and modification without materially departing from the spirit of the invention, I do not limit myself to such specific structure except as hereinafter claimed.

I claim:—

1. In an outside fishing tool, a pair of jaws pivoted intermediate the ends thereof, a wedge disposed between the upper ends of the jaws, said wedge and jaws being inseparable but capable of relative movement in the general direction of the longitudinal axis of the tool, said wedge during such movement, when in a direction causing the wedge to approach the outer ends of the jaws, causing adjacent faces of the lower ends of the jaws to approach one another, adjacent faces of the lower ends of the jaws having gripping teeth, the upper ends of the jaws combining to produce a substantially conical member, a plunger upon the lower end of which the wedge is secured and at the upper end of which means are provided for engagement with a string and a barrel loosely surrounding said plunger and having at its lower end a downwardly tapering bore adapted to receive the conical member produced by the jaws.

2. In an outside fishing tool, a pair of jaws having upon adjacent faces thereof intermediate their ends interdigitating ears, a pivot extending through said ears to connect the jaws, the jaws below the pivot having upwardly facing gripping teeth, the jaws above the pivot having opposed recesses the inner walls of which converge upwardly, a wedge disposed between said jaws and having its base end disposed downwardly, means for connecting the upper end of the wedge to a string, and a spring extending between said wedge and the base of the recesses and constantly urging said wedge toward the upper ends of the jaws.

3. In an outside fishing tool, a pair of jaws having upon adjacent faces thereof intermediate their ends interdigitating ears, a pivot extending through said ears to connect the jaws, the jaws below the pivot having upwardly facing gripping teeth, the jaws above the pivot having opposed recesses the inner walls of which converge upwardly, a wedge disposed between said jaws and having its base end disposed downwardly, means for connecting the upper end of the wedge to a string, springs extending between the upper ends of the jaws and a spring extending between said wedge and the base of the recesses and constantly urging said wedge toward the upper ends of the jaws.

4. In an outside fishing tool, a pair of jaws having upon adjacent faces thereof intermediate their ends interdigitating ears, a pivot extending through said ears to connect the jaws, the jaws below the pivot having upwardly facing gripping teeth, the jaws above the pivot having opposed recesses the inner walls of which converge upwardly, a wedge disposed between said jaws and having its base end disposed downwardly, means for connecting the upper end of the wedge to a string, springs extending between the upper ends of the jaws and a spring extending between said wedge and the base of the recesses and constantly urging said wedge toward the upper ends of the jaws, the means for connecting the upper edge of the wedge to a string comprising a plunger, a barrel surrounding the plunger and vertically movable thereon, the barrel having at its lower end a downwardly enlarging bore adapted to receive the upper ends of the jaws.

In testimony whereof I hereunto affix my signature.

EDGAR H. NEWKIRK.